United States Patent [19]
Murakami

[11] 3,936,147
[45] Feb. 3, 1976

[54] VARIABLE CHARACTERISTIC LIGHT FILTER

[75] Inventor: Sanjiro Murakami, Hyogo, Japan

[73] Assignee: Minolta Camera Kabushiki Kaisha, Osaka, Japan

[22] Filed: Oct. 15, 1973

[21] Appl. No.: 406,756

[30] Foreign Application Priority Data
Nov. 22, 1972 Japan.............................. 47-134967

[52] U.S. Cl. ................. 350/158; 350/148; 350/159
[51] Int. Cl.² ........................................... G02B 1/24
[58] Field of Search ............ 350/147, 148, 158, 159

[56] References Cited
UNITED STATES PATENTS

| | | | |
|---|---|---|---|
| 2,184,999 | 12/1939 | Land et al............................ | 350/158 |
| 2,298,059 | 10/1942 | Land.................................... | 350/148 |
| 2,527,593 | 10/1950 | Stadler................................ | 350/158 |

OTHER PUBLICATIONS
Holzinger et al., "Safety Goggles", IBM Tech. Disclosure Bulletin, Vol. 16, No. 2, July 1973, p. 647.

*Primary Examiner*—R. V. Rolinec
*Assistant Examiner*—Michael J. Tokar
*Attorney, Agent, or Firm*—Wolder & Gross

[57] ABSTRACT

A variable color light filter system comprises a variable light filter including a pair of superimposed different color chromatic polarizing components with axes at a right angle to each other and an achromatic polarizing filter component which is rotatable relative to the chromatic polarizing components. A quarter wave length retardation plate is positioned in front of the variable light filter and has its optical axis at 45° to the vertical. In another form the achromatic polarizing filter component is positioned between two pairs of superimposed chromatic polarizing components all of which are of different colors.

3 Claims, 3 Drawing Figures

VARIABLE CHARACTERISTIC LIGHT FILTER

The present invention generally relates to improvements in light filters and it relates particularly to a device for suppressing the polarizing effect of objects on color temperature correcting filters used in photography.

In color photography, it is the usual practice to use a color film balanced for the particular kind of light source to be used or to use a suitable color-temperature compensating filter to adapt the film to the color temperature of the related light source. Generally, the use of the color temperature compensating filters is preferred, since it is almost impossible to change the films to the one which is balanced for the particular kind of light source involved. The method of using color temperature compensating filters, however, has a defect in that numerous various filters have to be kept ready for use and, therefore, in carrying the filters various inconveniences result. In order to overcome the above defects and inconveniences, there have been devised variable-characteristics color temperature compensating filters which utilize the principles of polarizing filtration. The present invention is directed to just such a variable characteristics color temperature compensating filter.

It is a principal object of the present invention to provide an improved light filter system.

Another object of the present invention is to provide an improved variable color light filter system.

Still another object of the present invention is to provide an improved variable color light filter system of the polarizing type which is of uniform adjustable color response independent of the presence of vertical or horizontal plane polarized light in the incident light.

The above and other objects of the present invention will become apparent from a reading of the following description taken in conjunction with the accompanying drawing which illustrates preferred embodiments thereof, in which.

Figure 1:
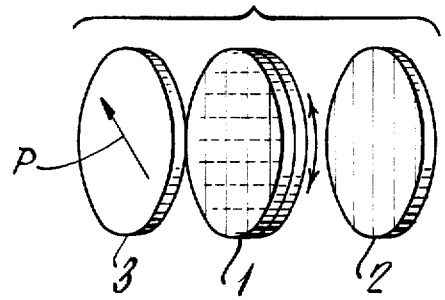
FIG. 1 is a perspective view of a preferred embodiment of the present invention.
Figure 2:
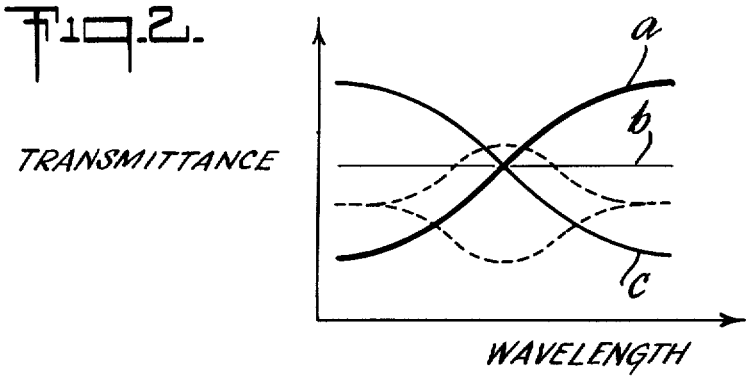
FIG. 2 is a graph illustrating the spectral characteristics thereof.

The variable-characteristics color temperature compensating filters have the construction as described hereafter. Polarizing filters formed from a polymer are largely classified into an all-color type or a specific type which is effective only for light in a specific wave length range. For brevity, the former type will be herein referred to as an achromatic polarizing filter and the latter as a chromatic polarizing filter. For example, if polarized light is transmitted through a chromatic polarizing filter which is effective only for blue light, just in the direction of absorption of the filter, only blue components of the light are absorbed, and light of longer wave length is transmitted therethrough, the transmitted light having a color complementary to blue. In FIG. 1, the reference numeral 1 designates a composite variable-characteristics polarizing filter which consists of two kinds of chromatic polarizing filters or filter components which are superposed one on the other with their planes of polarization disposed at right angles, one being effective for light of short wave lengths and the other for light of long wave lengths. There is indicated at 2 an achromatic polarizing filter or filter component which is positioned rearwardly to the composite filter 1. The outer natural light is a combination of lights having varied planes of polariziation, so that the light which has been transmitted through the chromatic composite polarizing filter 1 has no color yet, but has lights of short and long wave lengths having planes of polarization intersecting at right angles. In this instance, if the composite filter 1 or the rearwardly positioned achromatic polarizing filter 2 is rotated, there occurs a variation in the mixture ratio of the light of short wave length to the light of long wave length. That is to say, the spectral transmittance characteristics of the filters 1 and 2 as a whole can be varied by rotating the filter 1 or 2. Referring to FIG. 2, showing the characteristics of the variable color temperature compensating filter as described above, there is shown at $a$, the characteristics obtained by orienting the achromatic polarizing filter 2 in the same direction of polarization as the long wave length filter of the chromatic composite polarizing filter 1; at $c$ the characteristics obtained by orienting the achromatic filter 2 in the same direction of polarization as the short wave length filter of the chromatic composite polarizing filter 1; and at $b$ the characteristics obtained by orienting the achromatic filter 2 in a direction of polarization disposed at 45° with respect to those of the short and long wave length polarizing filters, respectively.

The above explained action of the variable-characteristics filter is based on the assumption that the incident light contains light polarized uniformly in all directions. When the incident light does not have a uniform distribution of polarization, the above mentioned action of the filter becomes incomplete or utterly impossible. For example, when the incident light is in the direction of absorption by the short wave length polarizer of the chromatic composite polarizing filter 1, the light which has been transmitted through the filter 1 does not contain light of short wave lengths, even if the achromatic filter 2 is rotated in either direction. This, therefore, does not contribute to enhancing the transmittance of light in the short wave length range. However, natural light often contains large amounts of plane polarized light such as light reflected from glass and water surfaces, so that the use of the variable characteristics filter as described above is highly restricted and limited.

The system of the present invention functions to remove the above mentioned defects of the variable characteristic color temperature compensating filter by using a quarter wave length retardation plate.

The principle of the present invention is to change plane or linearly polarized light into circularly polarized light, thereby bringing the relationship between the incident light and the variable characteristics filter substantially the same as in the case of normal light. A quarter wave length retardation plate is used for converting linear polarization into circular polarization. The quarter wave length retardation plate has different refractive indexes with respect to ordinary rays and extraordinary rays, and therefore ordinary rays and extraordinary rays incident in the same phase have a phase difference of ¼ wave length when leaving the quarter wave length retardation plate. In order to convert the linear polarization into circular polarization, it is necessary to divide the linearly polarized light uniformly into normal light and abnormal light. For this purpose, the linearly polarized light has to be introduced at 45° with respect to the optical axis of the quarter wave length retardation plate.

According to the present invention, a quarter wave length retardation plate, 3, is positioned in front of the variable characteristics color temperature compensating filter as shown in FIG. 1. In this connection, the arrow P indicates a direction extending along the quarter wave length retardation plate at 45° with respect to the vertical. The arrow P thus represents the optical axis of the quarter wave length retardation plate, so that linearly polarized light incident in the direction of the arrow P is not subjected to double refraction. An important feature of the present invention resides in the fact that the optical axis of the quarter wave length retardation plate is disposed at 45° with respect to the vertical.

It may be assumed that naturally occurring polarized light is not a light emitted from a luminous body but a light reflected from various objects. The most strongly polarizing reflective surfaces are such glossy surfaces as window glass, water, walls, floors, roads and the like, which are mostly disposed vertically or horizontally. It is therefore considered that naturally occurring polarizations are in most cases in a vertical or horizontal direction. On the contrary, the quarter wave length retardation plate 3 has its optical axis disposed at 45° with respect to the vertical, so that the polarized natural light invariably undergoes circular polarization while being passed through the retardation plate 3.

Figure 3:
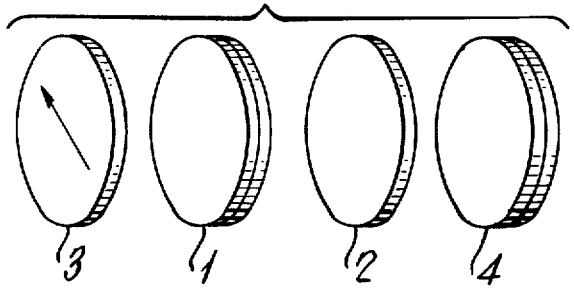
FIG. 3 is a view similar to FIG. 1 of another embodiment of the present invention.

FIG. 3 shows another embodiment of the present invention, wherein like numerals are used to designate the like parts as shown in FIG. 1. The embodiment of FIG. 3 differs from that of FIG. 1 in that a second chromatic composite polarizing filter, 4, is added. The composite filter 4 consists of two kinds of chromatic polarizer, one effective for green and the other effective for a complementary color, that is to say, for magenta, with the directions of polarization of the respective polarizers disposed perpendicular to each other. By turning this filter, the transmittance in the vicinity of green may be raised or lowered in the whole wave length range from violet to red. For example, the characteristics, $b$, of FIG. 2 may be raised or lowered as indicated by a broken line in the vicinity of green. This effect is also obtained in the case of $a$ or $c$. This is very convenient when handling a color-biased light source.

With the construction of the present invention as described above, which takes into consideration the conditions of naturally existing polarized light, the problems which would occur when incident light on the variable characteristics filter is polarized may be solved in an extremely expedient manner simply by adding a quarter wave length retardation plate. It will be understood that the filter system of the present invention is very simple in construction and affords highly useful effects.

In the foregoing description, this invention has been discussed in connection with the compensation of color temperature, however, it will also be understood that the variable characteristics filter of the present invention is not restricted only to correction of color temperature but that the same principle may be applied for other purposes.

I claim:

1. A variable light filter system comprising a filter having a chromatic polarizing filter section including superimposed first and second chromatic polarizing filter components of different color transmission characteristics and whose polarizing axes are substantially perpendicular to each other and an achromatic polarizing filter section, said chromatic and achromatic polarizing filter sections being rotatable relative to each other, and a quarter wave retardation plate disposed in front of said filter and having its optical axis at an angle of substantially 45° to the vertical.

2. The variable light filter system of claim 1 including a pair of said chromatic polarizing filter sections, the chromatic polarizing filter sections having different color transmission characteristics, said achromatic polarizing filter section being disposed between said chromatic polarizing filter sections.

3. The variable light filter system of claim 2 wherein said pair of chromatic polarizing filter sections are relatively rotatable.

* * * * *